(12) United States Patent
Henderson

(10) Patent No.: US 6,425,299 B1
(45) Date of Patent: Jul. 30, 2002

(54) RELATIVE HEIGHT GAUGE

(76) Inventor: Stephen Carl Henderson, Oaklea, Scurragh Lane, Skeeby, Richmond, North Yorkshire, DL10 5EG (GB)

( * ) Notice: Subject to any disclaimer, the term of this patent is extended or adjusted under 35 U.S.C. 154(b) by 0 days.

(21) Appl. No.: 09/445,005
(22) PCT Filed: Jun. 24, 1998
(86) PCT No.: PCT/GB98/01852
§ 371 (c)(1),
(2), (4) Date: Nov. 30, 1999
(87) PCT Pub. No.: WO99/00644
PCT Pub. Date: Jan. 7, 1999

(30) Foreign Application Priority Data
Jun. 26, 1997 (GB) .............................................. 9713501

(51) Int. Cl.$^7$ .......................... G01B 13/00; G01C 5/04; E02F 9/26
(52) U.S. Cl. ........................................ 73/865.2; 33/367
(58) Field of Search ........................... 73/865.2; 33/365, 33/366.15, 367

(56) References Cited
U.S. PATENT DOCUMENTS
4,026,156 A * 5/1977 Bowditch et al. ......... 33/367 X
4,167,876 A * 9/1979 Clements .................. 33/1 H X
4,452,078 A * 6/1984 Formanek et al. ......... 73/865.2

FOREIGN PATENT DOCUMENTS
GB 1344898 * 1/1974 ........... G01B/13/14
GB 2224845 A * 5/1990 ............ G01B/5/00
WO WO 94/13892 * 6/1994 ............. E02F/9/26

* cited by examiner

Primary Examiner—Thomas P. Noland
(74) Attorney, Agent, or Firm—Rodman & Rodman

(57) ABSTRACT

A gauge for monitoring the relative height of two points comprises a generally tubular conduit extending from a first end thereof via a first limb thereof to a monitoring position spaced from the first end and via a second limb of the conduit from the monitoring position to a second end of the conduit in the region of its first end, two immiscible fluids of different densities, each in one of the first and second limbs with a mutual interface within the region of the monitoring position, means to vary the relative vertical positions of the monitoring position on the one hand and the first and second conduit ends on the other, and a pressure comparator to compare the pressures of the fluids at the conduit ends.

10 Claims, 1 Drawing Sheet

RELATIVE HEIGHT GAUGE

BACKGROUND OF THE INVENTION

The present invention is a gauge by means of which the relative height of two components may be monitored and/or determined. It will be described as applied to the monitoring of the position of an excavator bucket relative to ground level or to a related datum level but is of value in a wide range of other applications.

In the use of a mechanical excavator to dig a hole or trench or some other excavation, it is usually necessary for the operator to leave the operating cab several times to observe or measure the depth at which the excavator bucket is currently working, in order to ensure that the excavation reaches, but does not exceed, the required depth. It is desirable to be able to monitor the currently achieved operating depth without the need to descend from the cab but no depth-monitoring device which is hitherto available is sufficiently robust, simple and reliable to be suitable for use in this specific situation. It is an object of the present invention to provide a relative height (including depth) gauge which overcomes at least some of the disadvantages of such gauges as currently exist, as applied to the determination of excavator operating depths.

In United Kingdom Patent Specification No GB 2224845, a device is described for determining the vertical distance between two elements. The device is exemplified in its application to monitoring any variation in the distance apart of a floating installation and a sea-bed drilling device, with the object of maintaining constant the altitude of the drilling head relative to the sea-bed.

In U.S. Pat. No. 4,026,156, apparatus is described for providing a precise measurement of small vertical displacements of a remote point from a reference point, such apparatus being said to be useful for the static deflection measurement of bridges, buildings and the like.

SUMMARY OF THE INVENTION

In contrast to the devices described in the foregoing patent specifications, the gauge according to the present invention for monitoring the relative height of two positions such as those of a mechanical excavator cab and its bucket by monitoring at a first said position the pressure difference between two fluids having an interface in the region of the second said position is characterised in that it comprises a generally tubular conduit extending from a first end thereof within the region of said first position via a first limb of said conduit to said second position and extending from said second position via a second limb of said conduit disposed generally parallel to said first limb back to a second end thereof within the region of said first end thereof, two immiscible fluids of different densities, each in one of said first and second limbs and with a mutual interface in the region of said second position, means to vary the relative vertical distance between said first and second positions, and a pressure comparator to compare the pressures of said fluids at said first and second conduit ends.

The manner in which the gauge of the present invention functions is simply explained. The two limbs of the generally tubular conduit together resemble an elongate U-tube with two immiscible fluids of different densities in the two limbs. When that U-tube is vertical or inclined, the interface between the fluids tends to move to apposition in which the pressures at the surfaces of the two fluids are in balance. When the U-tube is generally horizontal, there is no such tendency to move. Thus if the conduit is sealed at its ends with the two fluid pressures not, in balance, the fluid pressure difference between the conduit ends, as monitored by the pressure comparator, is an indication of the extent to which the "U-tube" has departed from a horizontal orientation which, duly calibrated, is in turn an indication of the vertical height difference between the fluid interface at the monitoring position and the conduit ends. When the pressure comparator is located at ground level or otherwise adjacent to the operating cab of an excavator, and the monitoring position is located within the region of the excavator bucket, that is at the outer end of the excavator operating arm, then the pressure comparator may be calibrated to indicate the current operating depth of the bucket.

In its simplest form, the generally tubular conduit comprises just the two limbs, which are preferably parallel to each other. However in a preferred form of the invention, in particular where it is desired to measure both positive and negative height differences, the conduit is modified in the region of the monitoring position in order to assist in maintaining the separation of the fluids. For example a fluid separator may be provided at that position. It is particularly preferred to form one or more generally parallel loops, for example between two and five such loops, in series in the region of the monitoring position. Preferably such loop or loops is/are inclined relative to the axis of movement of the conduit.

In one preferred embodiment of the gauge of the present invention, the sensitivity of the gauge is enhanced by doubling the changes in pressure difference between the conduit ends, by using coaxial or other twin conduit filled with the immiscible, fluids in four alternating lengths.

While the gauge according to the invention may be filled either with two liquids or with two immiscible or separated gases, the use of liquids is particularly preferred. In a most preferred form of the invention, two immiscible liquids are used but a small quantity of a gas, in particular air, is included in each limb of the conduit between the liquid therein and the end of the conduit. In this case, the pressure comparator monitors and/or determines the respective gas pressures.

Any form of pressure comparator by means of which the fluid pressures are compared without any intermixing may be used. It is particularly preferred to use a pressure comparator in which the pressures of two gases are compared and in which the gases contact the opposite sides of a membrane.

Because it is only the difference between the pressures at the two ends of the conduit which is being monitored, the finite values of those pressures are not themselves important. Thus the pressure of the system overall may be increased, if desired, to reduce the degree of movement of the fluids in the conduit. Variations in fluid pressure arising from ambient temperature changes or from changes in loading of the equipment may be ignored as it is only pressure differences which are monitored. The gauge may, however, be provided with means, for example a non-return valve, enabling the pressure in the conduit to be increased, and optionally also a pressure indicator to enable any loss of pressure via leaks to be detected.

The invention will now be further described with reference to the accompanying drawings, which illustrate schematically, by way of example only, one preferred form of the relative height gauge according to the present invention and wherein:

DETAILED DESCRIPTION OF THE INVENTION

The illustrated excavator comprises an operating cab 1 with a rearwardly-directed inner arm 2 and, pivoted downwardly at 3 at the outer end of the arm 2, a dipper arm 4 with an excavator bucket 5 at its lower end.

Figure 1:
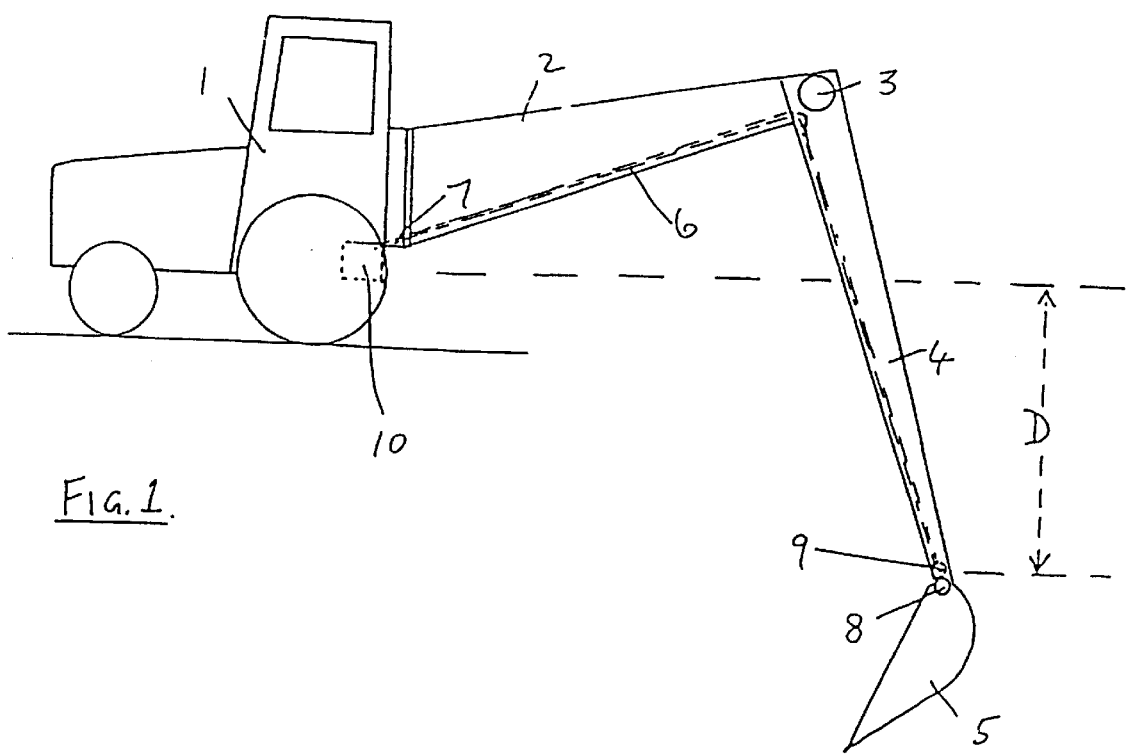
FIG. 1 illustrates the installation of the gauge in a mechanical excavator.
Figure 2:
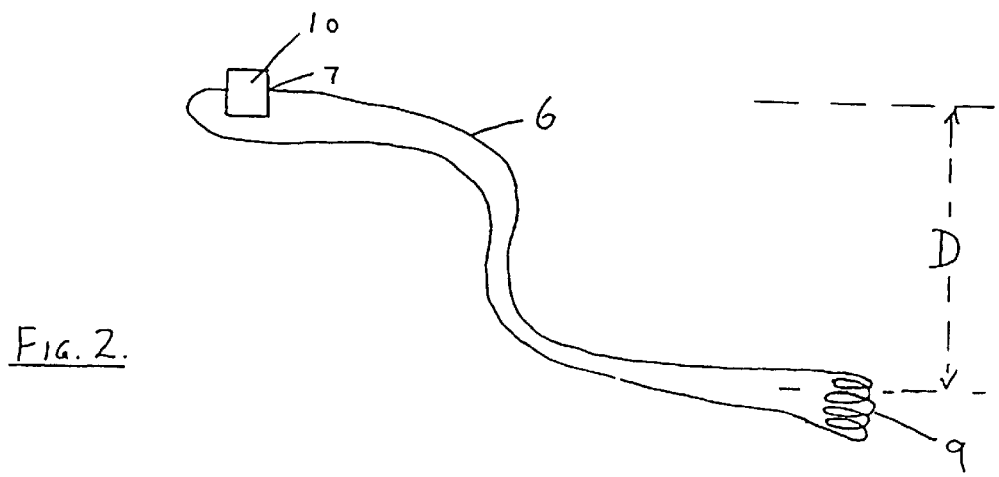
FIG. 2 is a diagrammatic illustration of the relationship of the key components of the gauge.

The dipper arm 4 may be telescopically extensible if desired. A length of plastics air pipe 6 is installed on the arms 2 and 4 with one end located adjacent to the rear of the cab at 7. The pipe 6, which is enclosed in a protective conduit, extends from the point 7 along the arms 2 and 4 to a point adjacent to the pivot point 8 of the bucket 5, where it is coiled to form four parallel loops 9 (of which only one is visible in FIG. 1) and then extends back along the arms to the point 7. Between the two adjacent ends of the pipe 6 at 7, a differential pressure transducer 10 is connected, whereby to compare the pressures at the two ends of the pipe 6.

The pipe 6 is almost filled, leaving only small volumes of air at the pipe ends, with two immiscible liquids of different density, for example kerosine and ethylene glycol, such that the interface between the liquids lies within loops 9 of the coiled section of the pipe. The position of the interface is such that the pressures at the surfaces of the two liquids are out of balance with each other in all positions of the excavator arms except where the loops 9 and the pipe ends 7 are at the same vertical height. Thus the pressure difference as determined at any time by the differential pressure transducer 10 is an indication of the vertical distance D between the loops and the pipe ends. The display of the transducer reading may be calibrated to give a reading of the value of D at that time. The display is located to be readable within the cab 1, such that the operator of the excavator may readily observe the digging depth of the bucket 5 without leaving the cab.

While in its most simple, illustrated form the relative height gauge according to the present invention comprises a single fluid interface and a single pressure comparator, two or more interfaces and/or pressure comparators may advantageously be provided for certain purposes. By way of example, the two limbs of the conduit may be interlinked by an additional pressure comparator at each of one or more further points along their length. In this manner, the vertical positions of these comparators, relative to each other and to the interface, may be monitored. Such a form of the invention may be applied to detect relative movement of different parts of an elongate structure, for example a bridge span or an aircraft wing, or of an articulated member such as the limb of a robot.

In a further form of the gauge according to the present invention, one or more additional fluid interfaces may be provided. By this means, the locating of a pressure comparator at a vulnerable position may be avoided, the comparator being installed at, or moved to, a more protected position, depending on the nature of a vehicle upon which the gauge is to be installed or on a proposed change of use of such a vehicle.

What is claimed is:

1. A gauge for monitoring the relative height of two positions by monitoring at one of said two positions the pressure difference between two fluids having an interface in the region of a second of said two positions, which gauge comprises a generally tubular conduit extending from a first end thereof within the region of said first position via a first limb of said conduit to said second limb of said conduit disposed generally parallel to said first limb back to second end thereof within the region of said first end thereof, two immiscible fluids of different densities, each in one of said first and second limbs and with a mutual interface in the region of said second position, means to vary the relative vertical distance between said first and second positions, and a pressure comparator to compare the pressures of said fluids at said first and second conduit ends.

2. A relative height gauge as claimed in claim 1, wherein a fluid separator is provided at said second position.

3. A relative height gauge as claimed in claim 2, wherein said fluid separator comprises one or more loops formed in the conduit.

4. A relative height gauge as claimed in claim 3, comprising between two and five said loops.

5. A relative height gauge as claimed in claim 1, wherein the immiscible fluids are contained alternately in four lengths of the conduit.

6. A relative height gauge as claimed in claim 1, wherein the two immiscible fluids are liquids.

7. A relative height gauge as claimed in claim 6, wherein a gas is included in each limb of the conduit between the liquid therein and the end of the conduit.

8. A relative height gauge as claimed in claim 7, wherein the pressure comparator compares the pressures of two gases, which gases contact the opposite sides of a membrane.

9. A relative height gauge as claimed in claim 1, comprising two or more said pressure comparators disposed at separate positions between the limbs of the conduit.

10. A relative height gauge as claimed in claim 1, comprising two or more said fluid interfaces.

\* \* \* \* \*